United States Patent [19]

Lovercheck

[11] 4,353,927
[45] Oct. 12, 1982

[54] FROZEN DESSERT PRODUCT

[76] Inventor: Susan L. Lovercheck, 210 Castle Dr., #33, Bethel Park, Pa. 15102

[21] Appl. No.: 264,346

[22] Filed: May 18, 1981

[51] Int. Cl.³ .................. A23G 9/00; A23G 9/24; A23G 9/26

[52] U.S. Cl. .................. 426/101; 426/565; 426/291; 426/249

[58] Field of Search ............ 426/565, 566, 567, 101, 426/291, 289, 249

[56] References Cited

U.S. PATENT DOCUMENTS

| | | | |
|---|---|---|---|
| 1,718,997 | 7/1929 | Burt | 426/101 |
| 1,901,394 | 3/1933 | Hassell | 426/565 |
| 1,968,732 | 7/1934 | Anagnos | 426/565 |
| 2,570,031 | 10/1951 | Gibson | 426/101 |
| 2,576,842 | 11/1951 | Lehner | 426/565 |
| 3,576,648 | 4/1971 | Goodman et al. | 426/565 |

FOREIGN PATENT DOCUMENTS 2904632  2/1978  Fed. Rep. of Germany ...... 426/565

Primary Examiner—Jeanette M. Hunter
Attorney, Agent, or Firm—Dale Lovercheck

[57] ABSTRACT

A matrix of frozen dessert having dispersed therein at least one edible inner bit with a water soluble first coating and having a substantially water insoluble second coating thereover, the inner bit being supported by the frozen state. Preferably an outer coating encloses the frozen matrix which additionally includes thereon at least one edible outer bit having a water soluble coating and color film, the outer bit being supported by the matrix coating.

7 Claims, 4 Drawing Figures

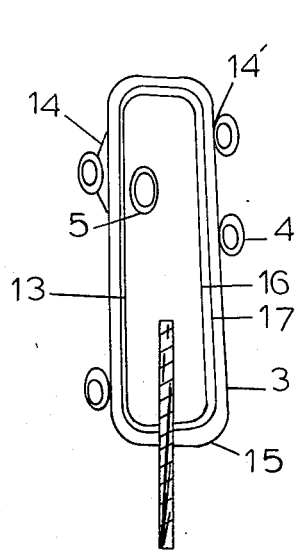
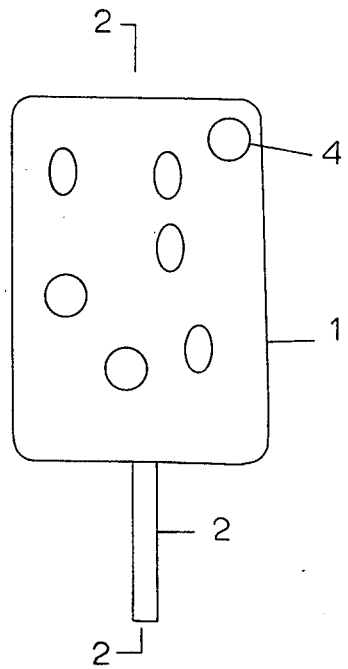
FIG. 2
FIG. 1
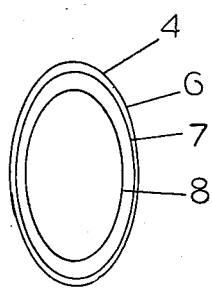
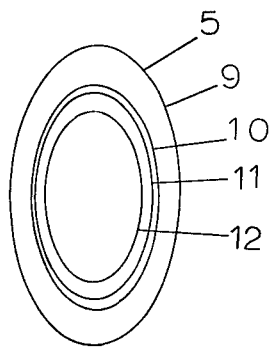
FIG. 3
FIG. 4

FROZEN DESSERT PRODUCT

BACKGROUND OF THE INVENTION

Various frozen confections are known in the art. Anagnos in U.S. Pat. No. 1,968,732 discloses an ice cream confection bar consisting of a core of ice cream coated with an edible substance, such as chocolate or icing. In producing these bars it is customary to provide a core of ice cream and dip this core in molten chocolate or some other coating material. In manufacturing ice cream confection bars Anagnos discloses that candy granules are mixed in as an ingredient of the ice cream and thus are evenly distributed. The candy used varies in size from that of a head of a pin to that of a small pea. Pecan brittle or taffy are disclosed by Anagnos as suitable candy.

SUMMARY OF THE INVENTION

The invention relates to a frozen dessert product comprising a normally liquid edible material frozen to a substantially solid state and at least one edible inner bit having an inner bit substrate with a water soluble inner bit first coating and a substantially water insoluble inner bit second coating over at least a substantial portion of the water soluble inner bit first coating, the inner bit being supported by the normally liquid edible material frozen to a substantially solid state.

In a preferred embodiment an outer layer of edible material substantially encloses the normally lquid material and additionally comprises at least one edible outer bit having an outer bit substrate with a water soluble outer bit first coating, the outer bit being supported by the outer layer, a portion of the water soluble outer bit first coating forming a portion of the outer surface of the frozen dessert product.

Frozen dessert products in accordance with the invention provide improved flavor quality. The inner bits may be mixed with the ingredients in the manufacture of the normally liquid material. The water soluble first inner bit coating is protected by the second bit coating. The consumer bites through the inner bit second coating releasing the flavor of the inner bit first coating which is preferably sugar.

Frozen dessert products in accordance with the invention have improved visual appeal. The colorful outer bits decorate the outer layer of edible material.

BRIEF DESCRIPTION OF THE DRAWING

FIG. 1 shows a preferred embodiment of the invention.

FIG. 2 is a cross sectional view at line 2—2 of the embodiment of FIG. 1.

FIG. 3 is a cross sectional view of an outer bit.

FIG. 4 is a cross sectional view of an inner bit.

DETAILED DESCRIPTION OF THE INVENTION

With more particular reference to the drawing FIG. 1 shows a preferred embodiment of a frozen dessert product 1 in accordance with the invention. The dessert product 1 is provided with hand hold stick 2 which as shown in FIG. 2 extends through an outer layer of edible material 3 and into normally liquid edible material 13 which is frozen to a substantially solid state. The dessert product has outer bits 4 and inner bits 5.

As shown in FIG. 3 the outer bits 4 have an outer bit color film 6, an outer bit coating 7 and an outer bit substrate 8.

Inner bit 5 as shown in FIG. 4 has inner bit second coating 9, which encloses inner bit color film 10, inner bit first coating 11 and inner bit substrate 12.

As shown in FIG. 2 an outer bit binder 14 may be provided to hold the outer bits 4 to the outer layer of edible material 3.

Preferred materials for use as bit substrates 8 and 12 are chocolate, peanut butter, nuts, mint and fruit. Especially preferred bit substrate materials are chocolate, peanut butter and peanut.

Preferred materials for use as inner bit first coating 11 and outer bit coating 7 include sugar, methyl cellulose, polyvinyl alcohol and gelatin. Especially preferred is sugar.

Preferred materials for use as inner bit second coating 9 include chocolate, wax, oil, butter, margarine, butterscotch and peanut butter. Especially preferred are chocolate and butter.

A preferred material for use as inner bit color film 10 and outer bit color film 6 is food coloring.

Preferred materials for use as outer layer of edible material 3 are chocolate and butterscotch. Especially preferred is chocolate.

Preferred outer bit binder materials include chocolate, butter, wax, oil, margarine, butterscotch and peanut butter. Especially preferred is chocolate.

Preferred materials for use as normally liquid edible material frozen to a substantially solid state 13 include ice cream, ice milk, custard and sherbet. Especially preferred are ice cream and ice milk.

In a preferred embodiment of the invention frozen dessert bars are made as is known in the art or obtained from a manufacturer, for example ice cream bars distributed by Kraft inc. Philadelphia, Pa. Coated candies are adhered to the dessert bars. A preferred method of adhering the coated candies to the dessert bars is by applying melted chocolate to the outer layer of edible material 3 and then placing the outer bits 4 therein. By then freezing, the melted chocolate hardens, affixing the coated candies i.e. outer bits 4.

In placing the coated candies in the melted chocolate it is preferred to leave at least the upper surface visible. Thus, the outer bit color film 6 decorates the the outer layer of edible material 3.

Alternatively, the outer layer of edible material 3 may be spot warmed to provide sites for adherence by the outer bits 4. The outer bits 4 are then placed on the warmed sites. Upon cooling the outer layer of edible material 3 adheres to the outer bits 4.

Similarly the outer bits themselves may be warmed and placed on the outer layer of edible material 3. By then cooling to freezer temperature the melted spot under each outer bit 4 solidifies adhering the cooled outer bit 4 to the outer layer of edible material 3 by heat seal 14'.

Before inner bit second coating 9 is added, both outer bits 4 and inner bits 5 may be M & M's(TRADEMARK) chocolate candies containing milk chocolate, sugar, corn starch and syrup, dextrin, gum acacia, artificial colors and FD & C Yellow No. 5. (where the milk chocolate used therein contains sugar, milk, chocolate, cocoa butter, peanuts, emulsifier, salt and artificial flavors).

Alternatively, some of the outer bits 4 and inner bits 5 before inner bit second coating 9 is added may be M & M's PEANUT chocolate candies. Additionally, some or all of these bits may be REESE's PIECES(TRADEMARK) containing sugar, partially defatted peanut meal, blend of vegetable oils (containing partially hydrogenated palm kernel and soybean oils); nonfat milk dextrose; corn syrup solids; salts; soya lecithin, an emulsifier dextrin; resinous glaze vanillin an artificial flavoring; artificial colors and carrageenan.

Normally liquid edible material frozen to a substantially solid state 13 may be vanilla flavored ice cream which may contain milkfat and nonfat milk, corn syrup, sugar, whey, natural and artificial flavor, mono and diglyerides, carob bean gum, cellulose gum, guar gum, polysorbate 80, carrageenan, and artificial color as used in ice cream bars sold under the SEALTEST(TRADEMARK) distributed by Kraft, Inc. Philadelphia, Pa. The outer layer of edible material 3 may be the chocolate flavored coating used in ice cream bars which may contain vegetable oil (coconut and/or soybean) sugar, cocoa, skim milk, cocoa processed with alkali lecithin, vanillin (an artificial flavor), and salt.

As shown in FIG. 2 the normally liquid edible material outer surface 16 is adjacent to outer layer inner surface 17. These two surfaces preferably adhere together. Any extention of the bits 5 into the outer layer of edible material 3 would assist the adherence of surfaces 16 and 17.

It is within the scope of the invention to provide an embodiment which does not have the outer layer of edible material 3, outer bits 4 or hand hold stick 2. Thus, one embodiment of the invention has normally liquid edible material frozen to a substantially solid state 13 with inner bits dispersed therein.

The inner bit color film 10 and the inner bit first coating 11 are preferably water soluble. The inner bit second coating 9 preferably is substantially water insoluble and substantially encloses the inner bit color film 10. By substantially enclosing the preferably water soluble inner bit color film, the substantially water insoluble inner bit second coating 9 acts to maintain the preferably water soluble film 10 and coating 11 free from dissolution into the normally liquid edible material 13.

Frozen dessert products of the invention having water soluble sugar first inner bit coatings 11 are advantageously sweet because of the flavorful water soluble sugar. During consumption of the frozen dessert product the inner bits 5 are broken apart exposing the preferably water soluble sugar inner bit first coating 11 to the aqueous digestive juices of the consumer's mouth which readily dissolve the sugar producing an especially sweet flavor.

EXAMPLE 1

Inner Bit Ice Cream 100 sugar coated milk chocolate bits are coated with melted chocolate and mixed into one half gallon of vanilla ice cream, which is warming at room temperature (68° F.) for 5 minutes. M & M's(TRADEMARK) PLAIN CHOCOLATE CANDIES are used as the bits. The ice cream is then cooled to freezer temperature (10°-20° F.), to form the inner bit ice cream frozen dessert product.

EXAMPLE 2

Mixed Inner Bit Ice Cream

The method of Example 1 is followed except that a mixture of M & M's(TRADEMARK) PLAIN chocolate candies and REESE'S (TRADEMARK) PIECES(TRADEMARK) are used as the bits.

EXAMPLE 3

Outer Bit Ice Cream 1 oz of milk chocolate is warmed in a 1 cup pan immersed in boiling water. The melted chocolate is applied as spots to the outer layer outer surface of an ice cream bar. An M & M is lightly pressed into the melted chocolate. The ice cream bar is then cooled to 10°-20° F. in a freezer to store the outer bit ice cream frozen dessert product.

EXAMPLE 4

Inner Bit Ice Cream Bar

The inner bit ice cream of Example 1 is formed into 1¼ oz portions coated with a chocolate layer of edible material and a wooden hand hold stick is inserted to form an inner bit ice crea bar frozen dessert product.

EXAMPLE 5

Inner and Outer Bit Ice Cream Bar

The inner bit ice cream bar of Example 4 is provided with outer bits in accordance with the procedure of Example 3 to form an inner and outer bit ice cream bar frozen dessert product.

EXAMPLE 6

Outer Bit Ice Cream

Following the procedure of Example 3 except that in place of applying spots of melted chocolate to the outer layer outer surface of the ice cream bar, the M & M's are heated in hot air (150°-250° F.) for 4 mins and then placed on the outer layer outer surface. Each hot M & M melts a spot of the chocolate of the outer layer outer surface beneath it. The ice cream bar is then cooled to 10°-20° F. in a freezer. As the spots of melted chocolate cool each forms a heat seal affixing the adjacent M & M to the outer layer of edible material.

EXAMPLE 7

Outer Bit Ice Cream

Following the procedure of Example 3 except thet in place of applying spots of melted chocolate, the convex surface of a hot spoon is lightly pressed against the outer layer outer surface to spot melt the chocolate. An M & M is pressed into each melted spot. The ice cream bar is then frozen to 10°-20° F. As the melted spots harden a heat seal of solidified chocolate forms to affix the adjacent M & M.

EXAMPLE 8

Buttered Inner Bit Ice Cream

Following the procedure of Example 1 but using butter in place of chocolate to coat the bits a buttered inner bit ice cream frozen dessert product is formed.

What is claimed is:

1. A frozen dessert product comprising a matrix of frozen dessert and at least one inner bit dispersed therein, wherein said dessert matrix is ice cream, ice milk, fruit sherbet, french ice cream, custard, french custard ice cream or mellorine, each of said inner bits having a solid center, a readily water-soluble solid confectionary coating enclosing said center and a substantially water insoluble coating substantially enclosing said confectionary coating whereby dissolution of said confectionary coating into said dessert matrix is suppressed by the substantially water insoluble coating so that when consumed, the solid confectionary coating dissolves in the mouth of the consumer, thereby providing enhanced flavor.

2. The product of claim 1 further comprising a matrix coating and at least one outer bit, each said outer bit having a solid center and a readily water-soluble confectionary coating with a solid colorful readily water-soluble film having an outer surface, each of said outer bits being added to and supported by said matrix coating after said matrix coating is formed so that a substantial portion of said colorful film outer surfaces form a substantial portion of said outer surface of said frozen dessert product, said matrix coating providing a moisture barrier between said outer bits and said frozen matrix whereby the color of said colorful film outer surfaces substantially contributes to the visual appeal of said frozen dessert product and said confectionary coatings enhance the flavor of said frozen dessert product.

3. The product of claim 1 wherein each said inner bit substrate is selected from the group consisting of chocolate, peanut butter, mint chocolated coated nut and nut.

4. The product of claim 2 wherein said outer bit substrate is selected from the group consisting of chocolate, peanut butter, mint and chocolate coated nut; and said first outer bit coating is sugar.

5. A frozen dessert product comprising,
a matrix of frozen dessert,
a matrix coating and at least one outer bit, wherein said dessert matrix is ice cream, ice milk, fruit sherbet, french ice cream, custard, french custard ice cream, or mellorine,
said matrix coating substantially enclosing said dessert matrix and said matrix coating having a matrix coating outer surface forming a substantial portion of the outer surface of said frozen dessert product,
each of said outer bits having a solid outer bit center a solid readily water-soluble confectionary coating enclosing said center and a solid colorful readily water-soluble film enclosing said confectionary coating, outer surface,
each of said outer bits being added to and supported by said matrix coating after said matrix coating is formed so that said dessert matrix a substantial portion of said colorful cilm outer surfaces form a substantial portion of said outer surface of said frozen dessert product, said matrix coating providing a moisture barrier between said outer bits and whereby the color of said colorful outer surfaces substantially contributes to the visual appeal of said frozen dessert product and said confectionary coatings enhance the flavor of said frozen dessert product.

6. The product of claim 5 wherein each said outer bit substrate is independently selected from the group consisting of chocolate, peanut butter, mint, chocolate coated nut and nut.

7. The product of claim 5 further comprising a hand hold stick, a portion of said hand hold stick extending through said matrix coating and into said matrix of edible material.

* * * * *